(12) United States Patent
Shimizu et al.

(10) Patent No.: US 7,405,386 B2
(45) Date of Patent: Jul. 29, 2008

(54) LIGHT RECEIVING DEVICE FOR READING AN OPTICAL MEDIUM WITH REDUCING INFLUENCE OF DARK CURRENT AND STRAY LIGHT PERFORMANCE

(75) Inventors: Yuzo Shimizu, Osaka (JP); Takeshi Matsuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 48 days.

(21) Appl. No.: 11/524,201

(22) Filed: Sep. 21, 2006

(65) Prior Publication Data

US 2007/0120044 A1   May 31, 2007

(30) Foreign Application Priority Data

Nov. 30, 2005   (JP) ............................. 2005-346777

(51) Int. Cl.
*H01J 40/14* (2006.01)
(52) U.S. Cl. ................................ 250/214 R; 250/201.5
(58) Field of Classification Search ............... 250/201.5, 250/559.4, 214 R, 214.1; 369/44.41–44.46, 369/124
See application file for complete search history.

(56) References Cited

U.S. PATENT DOCUMENTS 3,491,351 A * 1/1970 Smaller et al. ......... 360/114.07
5,003,525 A * 3/1991 Shimamoto et al. ...... 369/44.41

FOREIGN PATENT DOCUMENTS

JP   2004-71058 A   3/2004

* cited by examiner

*Primary Examiner*—Que T Le
(74) *Attorney, Agent, or Firm*—McDermott Will & Emery LLP

(57) ABSTRACT

Disclosed is a light receiving device for reading an optical medium compliant with any of different standards. The receiving device includes light receiving elements and an amplifier circuit. Each light receiving element is for receiving light reflected from an optical medium compliant with a different one of the standards and output a signal responsive to the received light. The amplifier circuit is for amplifying a signal derived from output of the light receiving elements. The signal amplified by the amplifier circuit is derived by subtracting an output signal of one of the light receiving elements that receives light from the optical medium from an output signal of the other light receiving elements.

2 Claims, 10 Drawing Sheets

PRIOR ART

PRIOR ART

LIGHT RECEIVING DEVICE FOR READING AN OPTICAL MEDIUM WITH REDUCING INFLUENCE OF DARK CURRENT AND STRAY LIGHT PERFORMANCE

This application is based on an application No. 2005-346777 filed in Japan, the contents of which are hereby incorporated by reference.

BACKGROUND OF THE INVENTION (1) Field of the Invention

The present invention relates to a light receiving device for reading optical media. More specifically, the present invention relates to a technique for accurately reading optical media compliant with different standards.

(2) Description of the Related Art

In recent years, optical media such as CDs (Compact Discs) and DVDs (Digital Versatile Discs) are widely used to store large amounts of music and video data, for example. In response to this trend, there is an increase in demand for optical pickups capable of reading both CD and DVD media. Unfortunately, however, the capability of handling both CD and DVD media often leads to the increase in the number of optical pickup parts or upsizing of the device.

To address the above problems, various optical pickups including the following have been suggested (see JP Patent Application Publication No. 2004-71058). FIG. 1 is a schematic view illustrating the structure of a conventional optical pickup. As illustrated in FIG. 1, an optical pickup 8 includes a monolithic integrated two-wavelength laser diode 801, a half-silvered mirror 802, a collimator lens 803, a mirror 804, an objective lens 805, a collective lens 806, and a light receiving element 807. The optical pickup 8 reads information from an optical medium 810.

The laser diode 801 emits laser light at different wavelengths depending on whether the optical medium 810 is a CD or DVD. The laser beam emitted form the laser diode 801 sequentially passes through the half-silvered mirror 802, the collimator lens 803, the mirror 804, and the objective lens 805, and converges at a point on the recording surface of the optical medium 810.

The laser light is then reflected off the recording surface of the optical medium 810 at a different intensity responsive to the state of the recording surface. The reflected light sequentially passes through the objective lens 805, the mirror 804, the collimator lens 803, the half-silvered mirror 802, and the collective lens 806 and is received by the light receiving element 807.

FIG. 2 is a plan view illustrating the structure of the light receiving element 807. As illustrated in FIG. 2, the light receiving element 807 includes ten photo diodes A1-A4, a1-a4, E and F. The photodiodes A1-A4 are provided to receive light reflected from CD, whereas photodiodes a1-a4 are provided to receive light reflected from DVD. The photodiodes E and F are provided to receive light reflected from either of CD and DVD.

The photodiodes A1-A4 and a1-a4 output radio frequency (RF) signals as well as focusing error signals. The photodiodes E and F output tracking error signals.

FIG. 3 is a circuit diagram illustrating the structure of a light receiving circuit including the light receiving element 807. As illustrated in FIG. 3, the light receiving circuit 10 includes differential amplifiers 1001-1004 each of which has a non-inverting input terminal and an inverting input terminal. Each non-inverting input terminal is applied with a reference voltage. Each inverting input terminal is connected in parallel to a different one of photodiode pairs, namely A1 & a1, A2 & a2, A3 & a3, and A4 & a4. With the structure stated above, each of the differential amplifiers 1001-1004 converts the current signal output from a corresponding one of the photodiode pairs A1 & a1, A2 & a2, A3 & a3, and A4 & a4 into a voltage signal and amplifies the resulting voltage signal.

In addition, the current signals output from the photodiodes E and F are also converted into voltage signals and amplified by the differential amplifiers 1006 and 1007, respectively. The output signals from the differential amplifiers 1001-1004 are added together by an adder 1005. The output signals of the differential amplifiers 1006 and 1007 are amplified by the amplifiers 1008 and 1009, respectively.

According to the structure stated above, the same optical parts are shared for handling both CD and DVD media. In addition, the same amplifier circuits are shared between paired photodiodes, one for CD and the other for DVD. Thus, the number of parts and the size the optical pickup are reduced.

It should be noted, however, that the optical pickup 8 illustrated in FIG. 3 involves the following setback. Since the inverting input terminal of each differential amplifier is connected to two photodiodes in parallel, dark current flowing through the two photodiodes is added together and amplified. Similarly, the influence of stray light doubles since the two photodiodes both receive stray light. The influence of electric current resulting from dark current and stray light (hereinafter, collectively referred to as "noise current") is more notable after the noise current present in the two photodiodes is added by the adder 1005. The noise current inevitably reduces the reading accuracy of the optical pickup 8 and narrows the output dynamic range.

SUMMARY OF THE INVENTION

The present invention is made in view of the above problems and attempts to provide a light receiving device capable of reading optical media of different standards, while reducing adverse influence of dark current and stray light.

In order to achieve the above aim, the present invention provides a light receiving device for reading an optical medium. The light receiving device includes: two light receiving elements each operable to receive light reflected from an optical medium compliant with a different one of two standards and output a signal responsive to the received light; and an amplifier circuit operable to amplify a signal derived from output of the light receiving elements. The signal amplified by the amplifier circuit is derived by subtracting an output signal of one of the light receiving elements from an output signal of the other light receiving element.

Generally, light receiving elements output noise signals regardless of whether light is received from an optical medium. In view of this, it is noted that the noise signals are canceled out by subtracting (i) the output signal of a light receiving element not receiving light reflected by the optical medium from (ii) the output signal of a light receiving element receiving light reflected by the optical medium. Consequently, the present invention achieves to increase the reading accuracy of the optical medium.

Note that the term "light receiving device" used in this specification refers generally to an optical disc drive device, an optical pickup of an optical disc drive device, and a semiconductor chip used in an optical pickup.

Here, the amplifier circuit may be a transimpedance amplifier circuit that includes a differential amplifier. The differential amplifier has an inverting input terminal and a non-inverting input terminal that are connected to the light receiving elements. The connection is switched, so that the output signal of one of the light receiving element is supplied to the inverting input terminal and the output signal of the other light receiving element is supplied to the non-inverting terminal.

With this arrangement, the transimpedance amplifier circuit is enabled to cancel out noise currents using the function of the differential amplifier. As a result, the reading accuracy of the light receiving device increases.

Here, the amplifier circuit may be operable to sum output currents of the light receiving elements after reversing the output current of one of the light receiving elements in polarity.

With this arrangement, the noise components in the output signals of the light receiving elements are canceled out. As a result, the reading accuracy of the light receiving device increases. Here, the light receiving device may further include a current mirror circuit operable to output a current that is equal in polarity and amperage to a current input thereto. The output current of said one light receiving element is reversed using the current mirror circuit, so that the amplifier circuit receives the output currents that are mutually opposite in polarity.

Here, the amplifier circuit may be a transimpedance amplifier circuit that includes a bias transistor and a transimpedance resistor. At least either of the bias and transimpedance resistors includes a plurality of impedance elements each having a different resistance. One of the impedance elements is selectively used in accordance with a standard of the optical medium to be read.

With this arrangement, the bias resistor and transimpedance resistor are adjusted to have impedance suitable for an optical medium of a respective standard. Thus, the offset voltage is reduced and the reading accuracy improves.

Here, the light receiving device may further include a judging unit operable, using an output signal of the amplifier circuit, to judge a standard of the optical medium to be read. The switching of the connection of the differential amplifier to the light receiving elements is made in accordance with a result of the judgment.

With this arrangement, the connection of the light receiving elements to the differential amplifier is switched without requiring any user operation. Thus, the connection is switched in accordance with the standard of the optical medium to be read, without sacrificing user convenience.

Here, the light receiving device may further include a judging unit operable, using an output signal of the amplifier circuit, to judge the standard of the optical medium to be read. The selection of the impendence elements is made in accordance with a result of the judgment.

With this arrangement, the impedance element to be used is switched without requiring any user operation. Thus, the impedance is selectively switched in accordance with the standard of the optical medium, without requiring any user operation.

Here, the light receiving device may further include a single semiconductor substrate having the light receiving elements disposed thereon.

With this arrangement, all the light receiving elements have a uniform property. Thus, the noise cancellation is carried out with higher accuracy.

Here, the light receiving elements and the amplifier circuit may be disposed on the single semiconductor substrate.

With this arrangement, the size and number of parts of the light receiving device are further reduced. As a consequence, the assembly accuracy improves and the manufacturing cost is reduced. To achieve further size reduction, the light receiving device may further include two light emitting elements disposed on the single semiconductor substrate and each operable to emit laser light compliant with a different one of the standards.

Here, the light receiving device may further include: an optical part disposed over a main surface of the semiconductor substrate and operable to guide laser light emitted by one of the light emitting elements to the optical medium to be read and to guide light reflected therefrom to a corresponding one of the light receiving elements. The optical part may include at least one of an optical filter, a mirror, a prism, and a diffraction grating.

Here, the semiconductor substrate may have a recess with a bottom and a sidewall. The light emitting element is fixed to the bottom of the recess. The laser light emitted by said one light emitting element is reflected off a reflective surface formed on the sidewall toward the optical medium to be read.

With this arrangement, the reflective surface is formed on the surface of the semiconductor substrate and the reflective surface guides the light output from the light receiving elements to the optical medium. As a consequence, the number of optical parts is reduced.

Here, each light receiving element may be a photodiode.

With this arraignment, the influence of dark current generated in the photodiodes is reduced. As a result, accuracy of reading the optical medium improves.

Here, each light receiving element may be composed of a plurality of pieces. Each piece of said one light receiving element is paired with a piece of said other light receiving element having a similar property. The subtraction of output signals is carried out between the paired pieces.

With this arrangement, even in the case where the light receiving elements are composed of a plurality of pieces in order to correct focusing error, the reading accuracy still improves.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes embodiments of a light receiving device according to the present invention, with reference to the accompanying drawings.

I. First Embodiment

An optical pickup consistent with a first embodiment of the present invention is generally similar in structure to the conventional optical pickup described above. The difference lies in the structure of a light receiving circuit employed. More specifically, in the optical pickup consistent with the present embodiment, two photodiodes are connected to a single differential amplifier so as to cancel out noise currents of the respective photodiodes. The description below mainly focuses on the difference with the conventional optical pickup.

(1) Structure of Light Receiving Circuit

Figure 4:
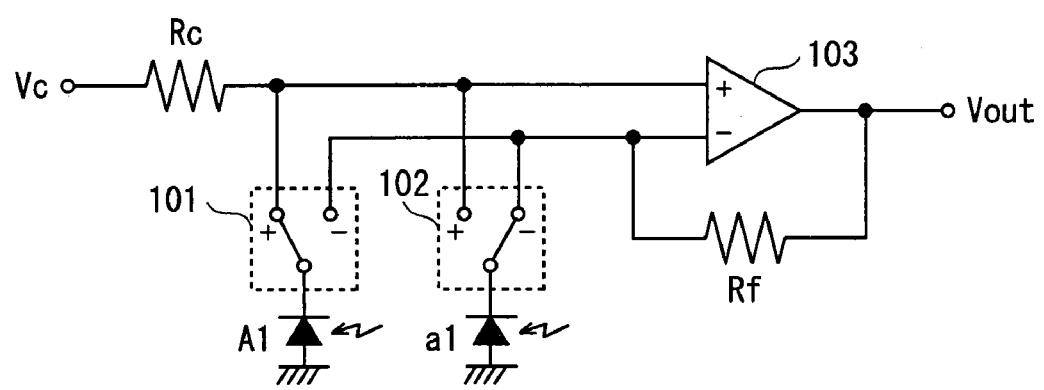
FIG. 4 is a circuit diagram illustrating part of a light receiving circuit consistent with a first embodiment of the present invention.

First, a description of the light receiving circuit consistent with the present embodiment is given. In the description, the focus is given to one pair of photodiodes sharing one differential amplifier. FIG. 4 is a circuit diagram illustrating part of the light receiving circuit consistent with the present embodiment.

As illustrated in FIG. 4, the light receiving circuit 1 includes photodiodes A1 and a1, switches 101 and 102, a differential amplifier 103, a bias resistor Rc, a transimpedance resistor Rf, and terminals Vc and Vout. Note that the same reference numerals are used to denote similar parts to those described above in relation to the conventional optical pickup.

The photodiode a1 is for receiving light reflected from DVD, whereas the photodiode A1 is for receiving light reflected from CD. The switch 101 selectively connects the photodiode A1 to either of the non-inverting and inverting terminals of the differential amplifier 103. The switch 102 selectively connects the photodiode a1 to either of the non-inverting and inverting input terminals of the differential amplifier 103. Note that each of the photodiodes A1 and a1 is connected to a mutually different one of the input terminals of the differential amplifier 103.

The differential amplifier 103 receives the reference voltage input from a terminal Vc, amplifies the difference signal between the respective signals that are input to the non-inverting and inverting input terminals, and outputs the resulting difference signal from the terminal Vout. The amplifier 103, the bias resistor Rc, and the transimpedance resistor Rf together constitute a so-called differential transimpedance amplifier. The differential signal is amplified in accordance with the resistances of the resistors RC and Rf.

Figure 1:
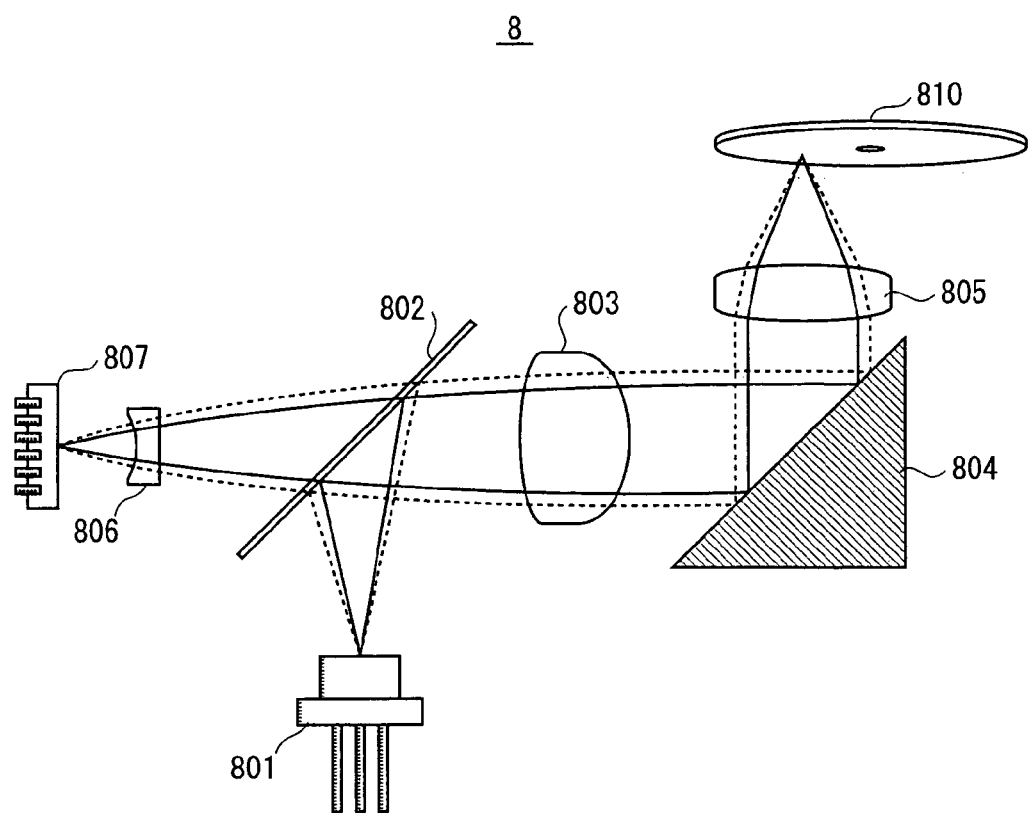
FIG. 1 is a schematic view illustrating the structure of a conventional optical pickup.
Figure 2:
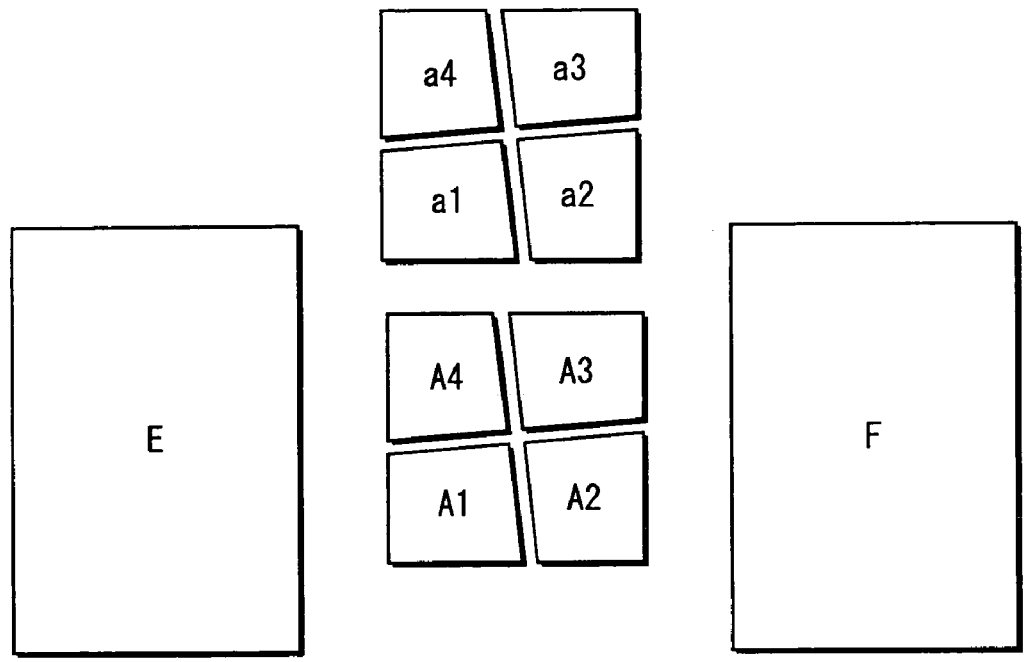
FIG. 2 is a plan view illustrating the structure of a conventional light receiving element.
Figure 3:
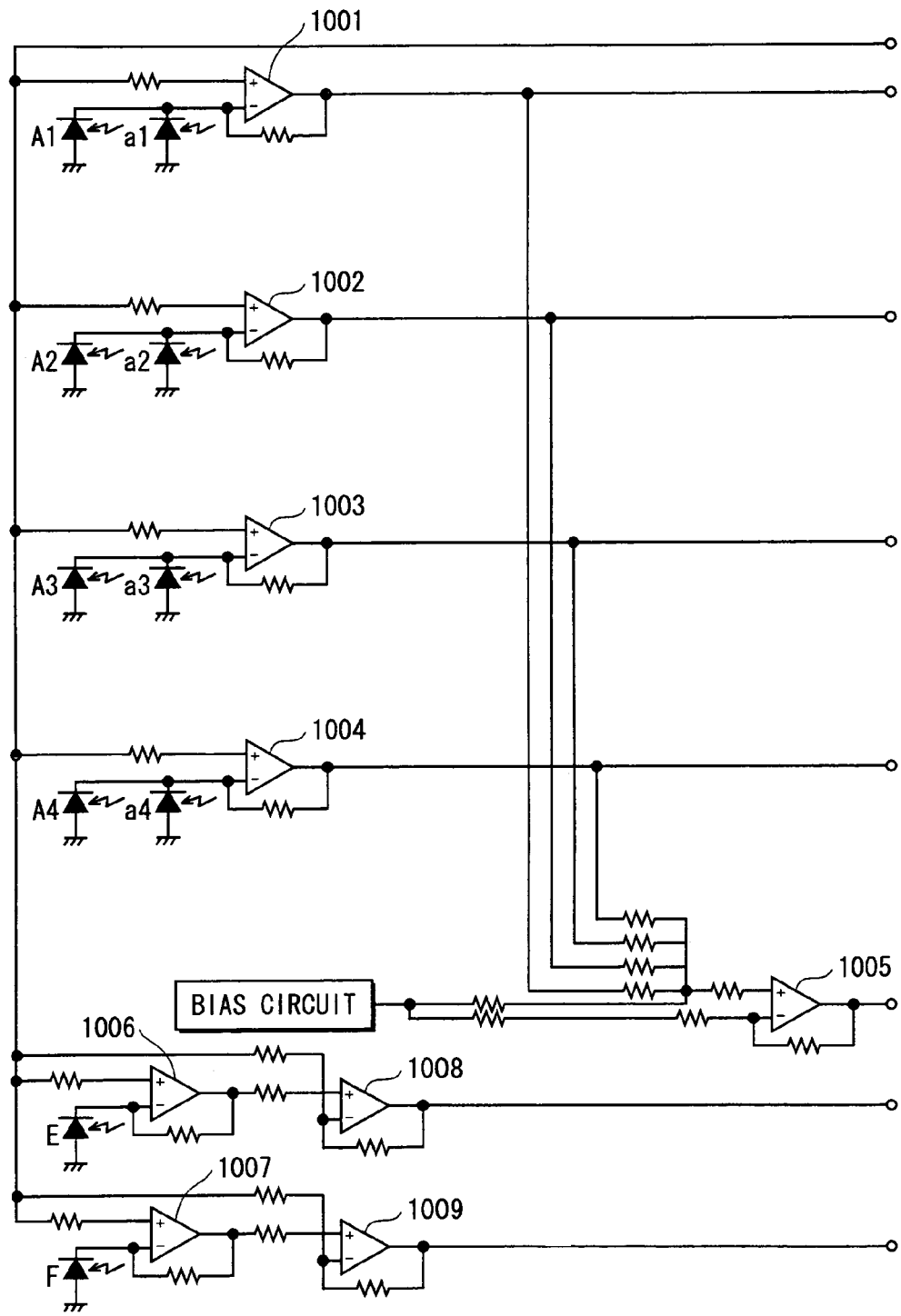
FIG. 3 is a circuit diagram illustrating the structure of a conventional light receiving circuit.

As illustrated in FIG. 2, the photodiodes a1 and A1 are generally identical in shape and formed on the same substrate through the same semiconductor process. It is known that dark current is temperature-dependent and approximately doubles every temperature rise of 10° C. Since the photodiodes a1 and A1 are disposed in close vicinity to each other, the photodiodes a1 and A1 are maintained at approximately the same temperature and thus generate dark currents of approximately the same amperage.

It is also known that stray light is light that is emitted by a semiconductor laser element and diffusely reflected by the optical parts and optical medium. Owing to their close vicinity to each other, the photodiodes a1 and A1 receive approximately the same amount of stray light. Thus, the photodiodes a1 and A1 generate electric currents of approximately the same amperage in response to the stray light.

According to the circuitry consistent with the present embodiment, before amplifying the output current of the photodiode receiving light from the optical medium, the noise current generated by the photodiode not receiving light reflected from the optical medium is subtracted. As a consequence, the influence of the dark current and stray light is reduced.

In addition, dark currents generated by the photodiodes a1 and A1 are substantially identical in temperature dependency. Thus, by canceling out the dark current components of photodiodes a1 and A1, the temperature characteristics of the overall optical pickup improve.

The same description applies to the other pairs of photodiodes a2 & A2, a3 & A3, and a4 & A4. Thus, the above described circuitry works well for the other pairs of photodiodes. Thus, it is ensured that the influence of dark current and stray light on the whole optical pickup device is reduced and optical media are read with accuracy and stability.

(b) Structure of Optical Pickup

Figure 5:
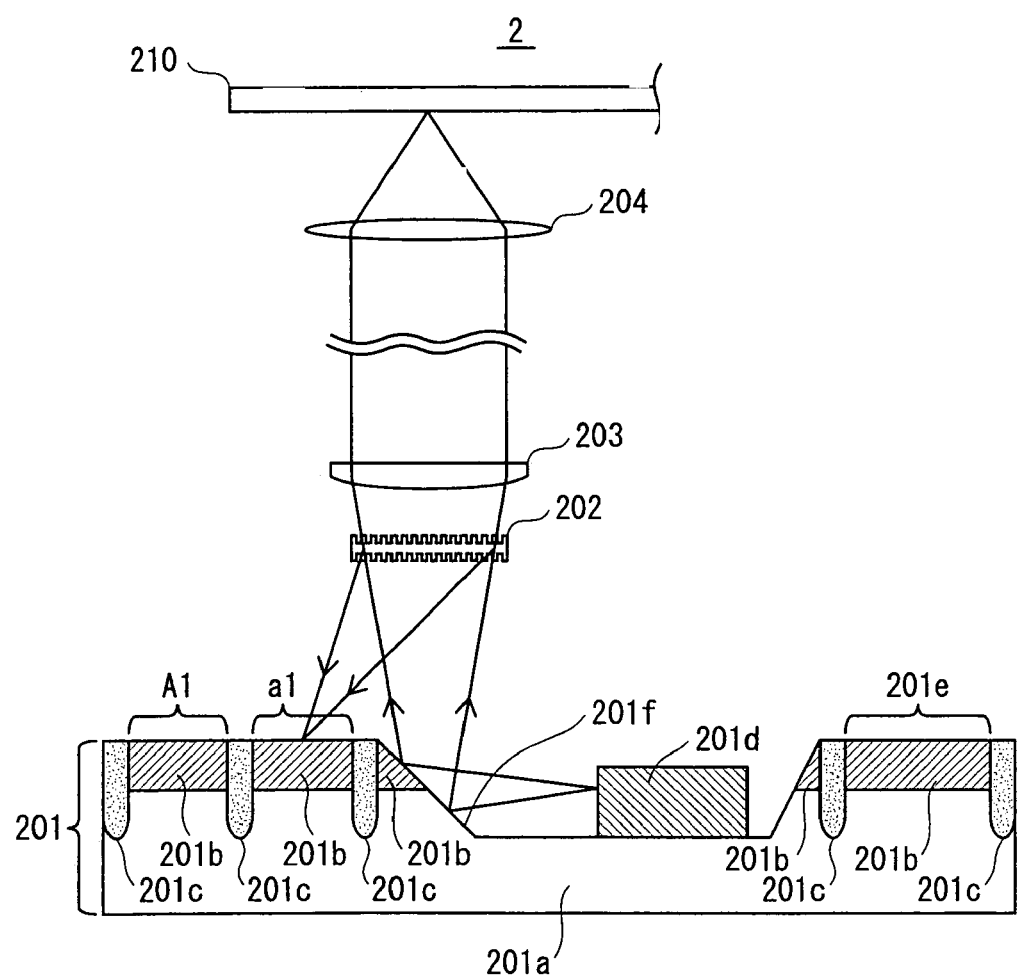
FIG. 5 is a sectional view of an optical pickup according to the first embodiment, illustrating semiconductor element that includes the light receiving circuit and also illustrating optical parts.

Next, a description is given of the structure of an optical pickup that includes the above light receiving circuit 1. FIG. 5 is a sectional view of an optical pickup according to the present embodiment. The figure clearly shows semiconductor element including the light receiving circuit and also show optical parts. As illustrated in FIG. 5, the optical pickup 2 includes a semiconductor element 201, a holographic optical element 202, a collimator lens 203, and an objective lens 204. The optical pickup 2 reads and writes information from and onto the optical medium 210.

The semiconductor element 201 includes a p-type semiconductor substrate 201a, and an n-type epitaxial layer 201b formed on the substrate 201a. The epitaxial layer 201b is divided into a plurality of pieces with an isolation region 201c. The boundary between the substrate 201a and the epitaxial layer 201b provides a pn junction.

The regions A1 and a1 of the semiconductor element 201 containing the epitaxial layers 201b provides the photodiodes A1 and a1, respectively. The region 201e of the semiconductor element 201 containing the epitaxial layer 201b provides the other elements of the light receiving circuit 1, such as a differential amplifier. Although not illustrated in the figure, the photodiodes A2-A4 and a2-a4 are also formed on the substrates 201a in a similar manner to the photodiode A1 and a1.

As illustrated in FIG. 5, the semiconductor element 201 has a recess formed in the surface thereof. The recess in turn has a bottom and a sidewall that is inclined toward the bottom and finished as a mirror surface 201f.

In order to form the mirror surface 201f, the semiconductor substrate 201a is made of silicon substrate having the (100) crystal plane and the off-angle of 5°-15° with respect to the crystal orientation <110>.

The mirror surface 201f is formed by anisotropic etching the above-mentioned silicon substrate, so as to form the (111) crystal plane. The anisotropic etching is carried out using, for example, an oxide film as the etching mask and potassium hydroxide based solution as the etchant. As a result of such etching, the sidewall of the recess is inclined relatively to the main surface of the substrate 201a within a range of 39°-49°. The inner surface of the sidewall is then coated with, for example, a metal membrane which is about 3000 Å in thickness to provide a high reflective coating. As a result, the sidewall is finished as a mirror surface of which reflection factor is no less than 99%.

Disposed in the recess of the semiconductor element 201 is a monolithic integrated two-wavelength laser diode 201d. In this example, the bottom of the recess is solder plated. The laser element 201s is fixed to the bottom of the recess, by thermally fusing the solder and gold (Au) electrodes formed on the bottom of the laser element.

The laser light emitted from the laser element 201d is guided by the mirror surface toward the holographic optical element 202 and converged on the recording surface of the optical medium 210 after passing thought the collimator lens 203 and the objective lens 204. The light reflected off the recording surface of the optical medium 210 passes through the objective lens 204 and the collimator lens 203 toward the holographic optical element 202 where the light is diffracted to enter into photodiode A1.

As described above, since the light receiving circuit is formed on the single semiconductor substrate 201a, the optical pickup is made up of fewer parts. Consequently, the assembly accuracy improves and the manufacturing steps and cost are reduced.

II. Second Embodiment

Next, a description is given of a second embodiment of the present invention. An optical pickup according to the present embodiment is generally identical to the optical pickup according to the first embodiment. The difference lies in the circuitry for converting and amplifying output signals of paired photodiodes. The focus of the description below is on the difference with the first embodiment.

Figure 6:
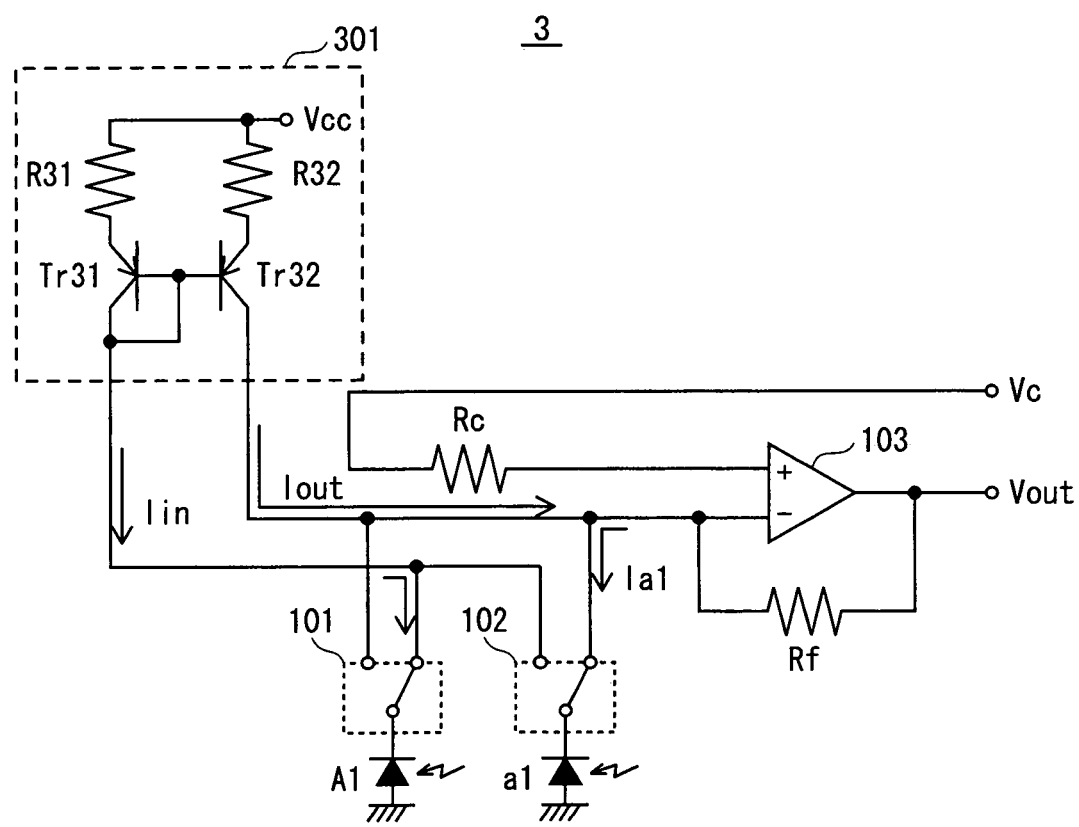
FIG. 6 is a circuit diagram illustrating part of a light receiving circuit according to a second embodiment the present invention.

FIG. 6 is a circuit diagram illustrating part of a light receiving circuit according to the present embodiment. As illustrated in FIG. 6, the light receiving circuit 3 includes photodiodes A1 and a1, switches 101 and 102, a differential amplifier 103, a bias resistor Rc, a transimpedance resistor Rf, terminals Vc and Vout, and a current mirror circuit 301. Note that the same reference numerals are used to denote similar parts to those described above in relation to the conventional optical pickup.

The photodiodes a1 and A1 receive light reflected from DVD and CD media, respectively. The switch 101 selectively connects the photodiode A1 to either of the inverting input terminal of the differential amplifier 103 and the input terminal of the current mirror circuit 301. The switch 102 selectively connects the photodiode a1 to either of the inverting input terminal of the differential amplifier 103 and the input terminal of the current mirror circuit 301. Note that each of the photodiodes A1 and a1 is connected to a mutually different one of the input terminals.

More specifically, in the case where the switch 101 connects the photodiode A1 to the inverting input terminal of the differential amplifier 103, the switch 102 connects the photodiode alto the input terminal of the current mirror circuit 301. Reversely, in the case where the switch 101 connects the photodiode A1 to the input terminal of the current mirror circuit 301, the switch 102 connects the photodiode a1 to the inverting input terminal of the differential amplifiers 103.

The differential amplifier 103, the bias resistor Rc, the transimpedance resistor Rf are identical to those of the embodiment 1.

The current mirror circuit 301 includes transistors Tr31 and Tr32, and resistors R31 and R32. The current mirror circuit 301 is applied with a constant voltage via the terminal Vcc. The current mirror circuit 301 receives a current signal via the input terminal and outputs an electric current via the output terminal. Here, the output electric current is equal in amperage and polarity to the received current signal. The input terminal of the current mirror circuit 301 is connected to the switches 101 and 102, and the output terminal is connected to the inverting input terminal if the differential amplifier 103.

Suppose, for example, playback of a DVD is to be executed. In order to execute DVD playback, the switch 102 connects the photodiode a1 to the inverting input terminal of the differential amplifier 103, and the switch 101 connects the photodiode A1 to the input terminal of the current mirror circuit 301.

As a result, the inverting input terminal of the differential amplifier 103 receives a current Ia1, which is the signal current of the photodiode a1 superimposed with a noise current. On the other hand, since the photodiode A1 receives no light signals, input to the current mirror circuit 301 is entirely a noise current Iin. The current mirror circuit 301 outputs the current Iout to the inverting input terminal of the differential amplifiers 103. As described above, the current Iout is equal to the noise current Iin received from the photodiode A1.

The noise currents generated by the photodiodes a1 and A1 are approximately equal to each other. Thus, the output current Iout of the current mirror circuit 301 is also approximately equal to the noise current. Furthermore, the current Ia1 and Iout are mutually opposite in polarity and thus cancel out each other. As a result, the inverting input terminal of the differential amplifier 103 receives the current remaining after removing the noise current components from the current Ia1.

The circuitry described above also works well for the other pairs of photodiodes a2-a4 with A2-A4, respectively. Consequently, the optical pickup is enabled to eliminate the problems associated with dark current and stray light as well as temperature dependency.

III. Third Embodiment

Next, a description is given of a third embodiment of the present invention. An optical pickup according to the present embodiment is generally similar in structure to the optical pickup according to the first embodiment. The difference lies in that the amplification factor of signal current is changed in accordance with the type of an optical medium. The focus of the description below is on the difference with the first and second embodiments.

Figure 7:
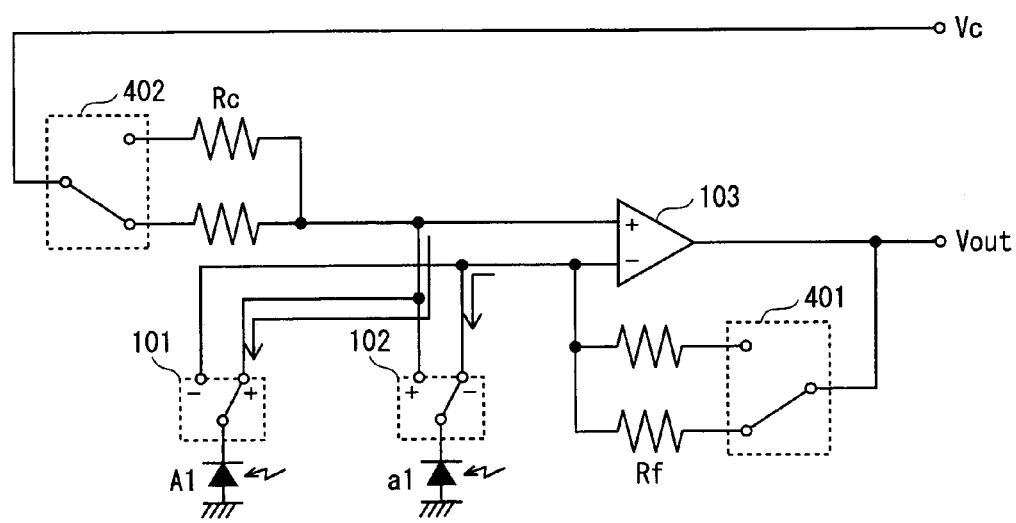
FIG. 7 is a circuit diagram illustrating part of a light receiving circuit according to a third embodiment of the present invention.

FIG. 7 is a circuit diagram illustrating part of a light receiving circuit according to the present embodiment. As illustrated in FIG. 7, the light receiving circuit 4 includes photodiodes A1 and a1, switches 101, 102, 401, and 402, a differential amplifier 103, two bias resistors Rc, and two transimpedance resistors Rf, and terminals Vc and Vout.

The two bias resistors Rc have mutually different resistance values and are connected electrically in parallel to the non-inverting input terminal of the differential amplifier 103. The switch 402 selectively connects one of the two bias resistors Rc to the terminal Vc.

The two transimpedance resistors Rf have mutually different resistance values and are connected electrically in parallel to the inverting input terminal of the differential amplifier 103. The switch 401 selectively connects one of the two transimpedance resistors Rf to the terminal Vout.

The changeover between the switches 401 and 402 is made in accordance with whether the optical medium subject to recording or playback is a DVD or a CD.

With this arrangement, the output signal is appropriately amplified, irrespective of the fact that the properties of the output signals of the photodiodes A1 and a1 differ from each other due to the difference in wavelength of incident light.

Furthermore, changeover between the two bias resistors Rc as well as between the two transimpedance resistors Rf is made, so that the input impedance of the non-inverting input terminal and the inverting input terminal of the differential amplifiers 103 is made to match. As a consequence, the offset voltage is maintained at a low level.

Figure 8:
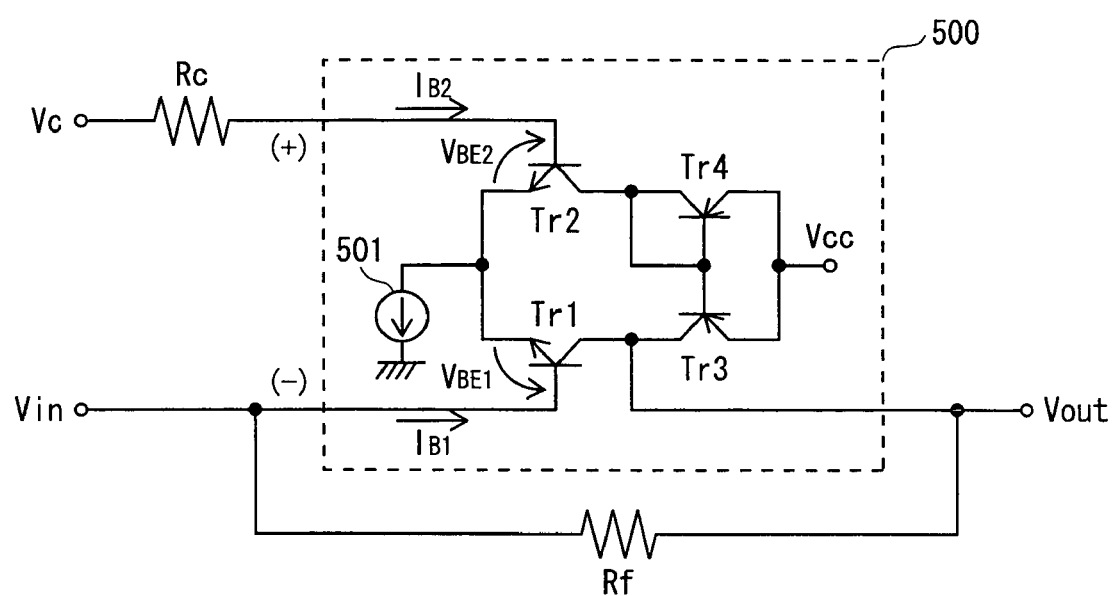
FIG. 8 is a circuit diagram of a transimpedance amplifier circuit, illustrating the internal structure of an exemplary differential amplifier circuit.

FIG. 8 is a circuit diagram of a transimpedance amplifier circuit, illustrating the internal structure of an exemplary differential amplifier circuit. As illustrated in FIG. 8, the transimpedance amplifier circuit 5 includes a differential amplifier 500, a bias resistor Rc, a transimpedance resistor Rf, a reference voltage terminal Vc, an input terminal Vin, and an output terminal Vout. The differential amplifier 500 in turn includes transistors Tr1-Tr4, a constant current power source 501, and a constant voltage power supply Vcc.

The transistor Tr1 carries the base-emitter voltage VBE1 and the transistor Tr2 carries the base emitter voltage VBE2. In addition, the transistors Tr1 and Tr2 carry the base currents IB1 and IB2, respectively.

Suppose, for example, that the transimpedance amplifier circuit 5 is employed in an optical pickup. In this case, if the photodiodes generate an output voltage while receiving no light signals, the output bias voltage may fall outside the designed range or the output dynamic range may be narrower. This often leads to inaccurate reading of the optical medium or inappropriate correcting of tracking errors and focusing errors. For the reasons stated above, it is desirable that the output terminal Vout makes no output voltage as long as the input current to the input terminal Vin is zero.

Generally, the circuit elements vary in their properties. Owing to the variations, the transimpedance amplifier circuit 5 has the output offset voltage given by the following expression.

$$Voff=(VBE1-VBE2)+(Rf-Rc)\times(IB1-IB2)$$

In order to eliminate the offset voltage Voff output in response to zero input current, the following conditions must be satisfied:

Rc=Rf;

VBE1=VBE2; and

IB1=IB2.

Unfortunately, however, even if the optical pickup satisfies the condition Rc=Rf, the input impedances of the differential amplifier differs between the base terminals of the transistors Tr1 and Tr2 by the photodiodes A1 and a1. Thus, IB1 is not equal to IB2 and there still remains the offset voltage Voff.

According to the present invention, one of the transimpedance resistor Rf and the bias resistor Rc is selectively connected, depending on which of the photodiodes A1 and a1 is connected to the differential amplifier 500. Thus, the input impedances of the differential amplifier is made to equal between the base terminals of the transistors Tr1 and Tr2. Thus, the offset voltage Voff is made to zero.

IV. Forth Embodiment

Next, a description of a fourth embodiment of the present invention is given. According to the present embodiment, an optical disc drive apparatus has an optical pickup that is generally identical to the optical pickup according to the third embodiment. The disc drive apparatus is capable of discriminating the type of optical media using the output signal of the differential amplifier.

Figure 9:
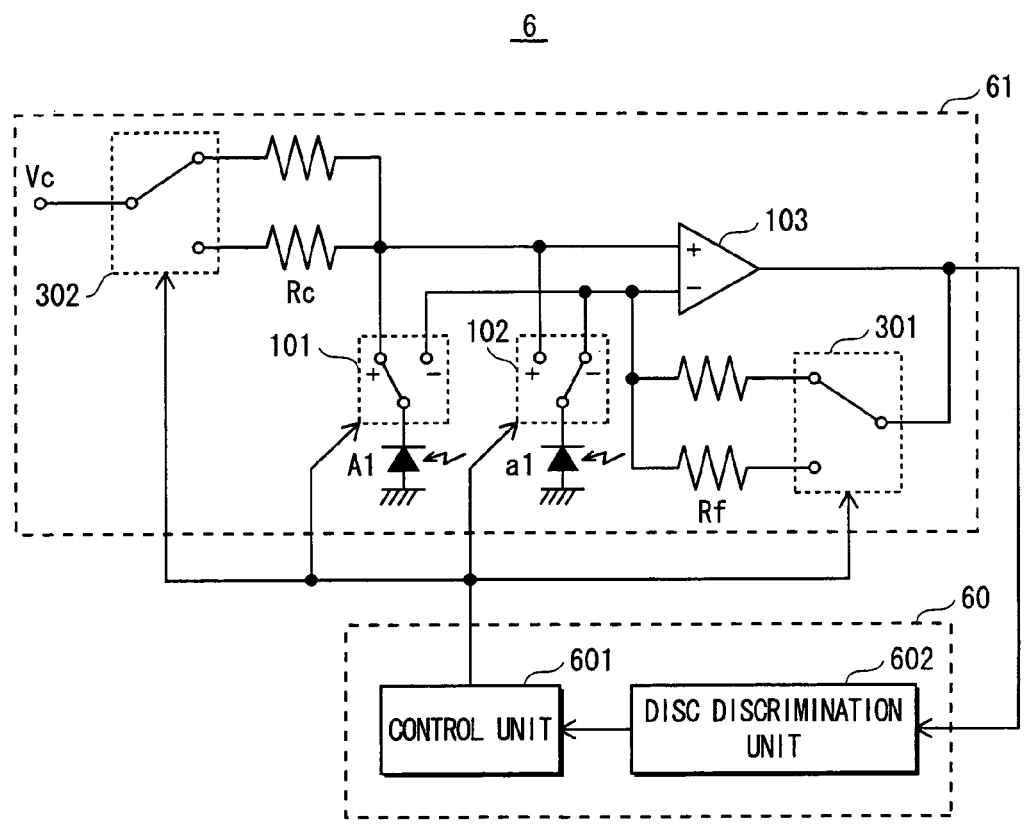
FIG. 9 is a circuit diagram showing part of an optical disc drive apparatus according to a fourth embodiment of the present invention.

FIG. 9 is a circuit diagram showing part of the optical disc drive apparatus according to the present embodiment. As illustrated in FIG. 9, the optical disc drive apparatus 6 includes a control circuit 60 and a light receiving circuit 61. The control circuit 60 in turn includes a control unit 601 and a disc discrimination unit 602.

Similarly to the light receiving circuit 3 according to the third embodiment, the light receiving circuit 61 includes photodiodes A1 and a1, switches 101, 102, 301, and 302, a differential amplifier 103, and a bias resistor circuit Rc, a transimpedance resistor circuit Rf, and terminals Vc and Vout.

When an optical medium is located to the disc discrimination unit 602 using, for example a disc tray, the disc discrimination unit 602 causes, via the control unit 601, the optical medium to be irradiated with laser light of specific wavelengths. The differential amplifier 103 outputs a signal in response the reflected laser light. The disc discrimination unit 602 judges the type of the optical medium based on the signal. The control unit 601 outputs a different control signal depending on the judgment result by the disc discrimination unit 602 to carry out the changeover among the switches 101, 102, 301, and 302.

With the above arrangement, a suitable one of the photodiodes A1 and a1 is connected to the differential amplifier 103, depending on the type of optical medium. In addition, a suitable one of the bias resistor and the transimpedance resistor is used, depending on the type of optical medium. As a consequence, the influence of noise current is reduced and the offset voltage is maintained at a low level, so that reading and playback of optical media are carried out with accuracy.

V. Modifications

Up to this point, the description has been given to the embodiments of the present invention. It should naturally appreciated, however, that the present invention is not limited to the specific embodiments described above and various modifications including the following may be made.

(1) According to the second embodiment, the current mirror circuit 301 illustrated in FIG. 6 is employed. It should be naturally appreciated, however, that the present invention is not limited to such. It is applicable to replace the current mirror circuit 301 with any other current mirror circuit having a different structure. The effect of the present invention is achieved as long as the current mirror circuit is capable of outputting current of the same polarity and amperage as those of the input current.

(2) According to the above embodiments, an inverting amplifier is used as the light receiving circuit. It should be naturally appreciated, however, that the present invention is not limited to such. A non-inverting amplifier may be used instead.

Figure 10:
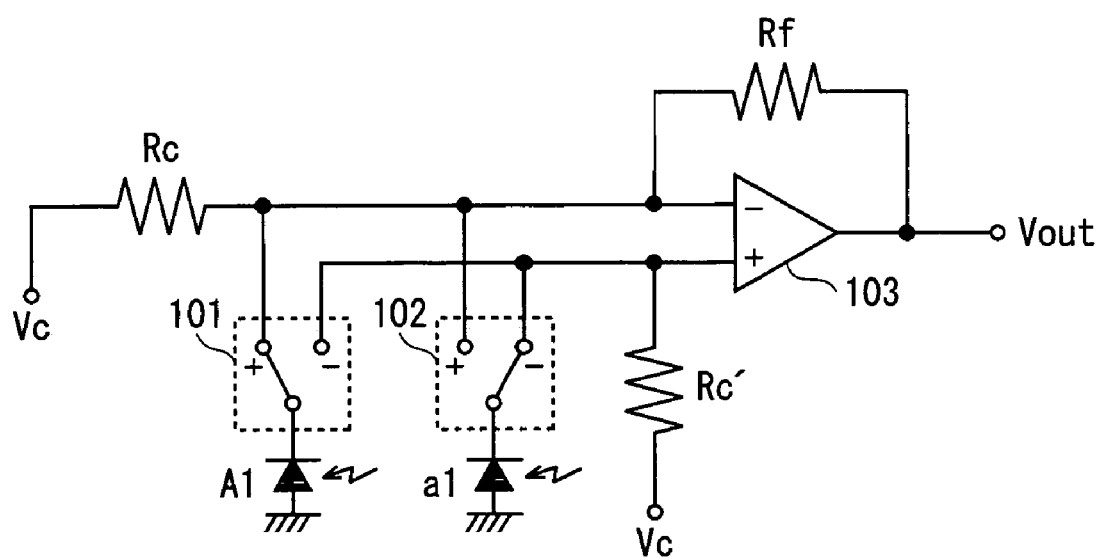
FIG. 10 is a circuit diagram illustrating part of a light receiving circuit according to a modification (2) of the present invention.

FIG. 10 is a circuit diagram illustrating part of the light receiving circuit according to the present modification. With the structure illustrated in the figure, as long as the switches 101 and 102 operate in relation to each other, the advantages of the first embodiment are similarly achieved. Furthermore, it is applicable to employ a non-inverting amplifier in the second and other embodiments to achieve the same advantages to those achieved by the respective embodiments.

(3) According to the above embodiments, the anodes of the photodiodes are grounded and the cathodes are connected to the differential amplifiers. It should be naturally appreciated, however, that the present invention is not limited to such. It is applicable to impose a fixed potential to the cathodes and extract signal currents from the anodes of the photodiodes.

(4) According to the above embodiments, the optical media to be recorded or to be played back are DVDs and CDs. It should be naturally appreciated, however, that the present invention is not limited to such. Any other optical media may be used for the recording and playback process, instead of DVDs and/or CDs. It is also applicable that three or more types of optical media may be used for the recording and playback process. Examples of such optical media include BDs (Blu-ray Discs).

(5) According to the above embodiments, the photodiodes are used for detecting quantity of signal light. It should be naturally appreciated, however, that the present invention is not limited to such. Any light receiving elements other then photodiodes may be used to achieve the advantages of the present invention, such as reduction of the noise current resulting from stray light.

(6) The third embodiment is based on the first embodiment, with the addition of the bias resistor Rc and the transimpedance resistor Rf that are selectively used. It should be naturally appreciated, however, that the present invention is not limited to such. The second embodiment may be modified so as to selectively use the bias resistor Rc and the transimpedance resistor Rf. Such modification still achieves the same advantages.

(7) According to the third embodiment, a pair of the bias and transimpedance resistors Rc and Rf is connected in parallel and the changeover between the paired resistors is made. It should be naturally appreciated, however, that the present invention is not limited to such. It is also applicable to connect three or more bias and transimpedance resistors Rc and Rf and carry out the changeover among the three resistors. In addition, the number bias resistor Rc may not be equal to the number of transimpedance resistor Rf. It is even applicable that the all resistors are bias resistors, and vice verse. In either case, the advantages of the present invention are achieved.

(8) According to the third embodiment above, the switches are placed between the output terminal of the differential amplifier and the transimpedance resistor Rf as well as between the reference voltage terminal Vc and the bias resistor Rc. It should be naturally appreciated, however, that the present invention is not limited to such. It is applicable to place the switches between the inverting input terminal of the differential amplifier and the transimpedance resistor Rf as well as between the non-inverting input terminal of the differential amplifier and the bias resistor Rc. In either case, the advantages of the present invention are still achieved.

(9) According to the above embodiments, the bias resistor Rc and the transimpedance resistor Rf are employed as the resistive elements. It should be naturally appreciated, however, that the present invention is not limited to such. Any impedance element other then the above resistive element may be used.

(10) According to the fourth embodiment, the judgment is made as to whether the optical medium is a DVD or a CD. It should be naturally appreciated, however, that the present invention is not limited such. The judgment may be made in more detail as to whether the CD is CD-ROM, CD±R, CD±W, or the like, and the DVD is DVD-ROM, DVD-RAM, DVD±R, DVD±RW, or the like.

The detailed judgment according to the this modification is especially effective in the example, as in the third embodiment, that the changeover between the bias resistor Rc and the transimpedance resistor Rf is carried out in accordance with the property of the optical medium.

(11) The third embodiment is described with reference to FIG. 8 illustrating the internal structure of the differential amplifier. It should be naturally appreciated, however, that the present invention is not limited to such. Any other differential amplifier having a different structure may be used to achieve the advantages of the present invention.

(12) The first embodiment is described with reference to FIG. 5 illustrating the locations of the photodiodes in the semiconductor element. It should be naturally appreciated, however, that the present invention is not limited to such. The advantages of the present invention are achieved with different arrangement of the photodiodes in the semiconductor element.

Furthermore, according to the first embodiment, pn junction photodiodes are employed. Yet, this is merely an example and photodiodes with any other types of junctions may be used. In addition, the semiconductor substrate may or may not be a p-type. An n-type semiconductor substrate is applicable to achieve the advantages of the present invention.

(13) According to the first embodiment, the holographic optical element, the collimator lens, and the objective lens are arranged on or over the semiconductor substrate to provide a mechanism for guiding laser light to the optical medium. It should be naturally appreciated, however, that the present invention is not limited to such. It is applicable to arrange such optical elements as an optical mirror, an optical prism, and a diffraction grating on or over the semiconductor substrate, instead of or in addition to the above-mentioned elements.

(14) According to the above embodiments, the monolithic integrated two-wavelength laser diode is employed. It should be naturally appreciated, however, that the present invention is not limited to such. The advantages of the present invention are still achieved with a plurality of single-wavelength laser diodes.

(15) According to the above embodiments, the output from the photodiode receiving light signal is supplied to the inverting input terminal, and the output from the photodiode not receiving light signal is supplied to the non-inverting input terminal. It should be naturally appreciated, however, that the present invention is not limited to such. It is applicable to supply the output from the photodiode not receiving light signal to the inverting input terminal, and the output from the photodiode receiving light signal to the non-inverting input terminal.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A light receiving device for reading an optical medium, comprising:
   a reference voltage terminal;
   a first light receiving element operable to receive stray light resulting from diffused reflection from the optical medium and output a first signal responsive to the received stray light;
   a bias resistor connected between the reference voltage terminal and the first light receiving element;
   a second light receiving element operable to receive the stray light and light reflected from the optical medium and output a second signal responsive to the received stray light and reflected light; and a differential amplifier circuit operable to amplify a third signal that is derived by subtracting, from the second signal, the first signal that is received from the first receiving element via the bias resistor.

2. The light receiving device according to claim 1, wherein the differential amplifier circuit is a transimpedance amplifier circuit, the differential amplifier circuit has an inverting input terminal and a non-inverting input terminal, and the first signal is supplied to the non-inverting input terminal and the second signal is supplied to the inverting input terminal.

* * * * *